(12) United States Patent
Capehart et al.

(10) Patent No.: US 7,718,753 B2
(45) Date of Patent: May 18, 2010

(54) ORGANIC SUPERACIDS, POLYMERS, DERIVED FROM ORGANIC SUPERACIDS, AND METHODS OF MAKING AND USING THE SAME

(75) Inventors: Tenneille Weston Capehart, Rochester, MI (US); Gail Capehart, legal representative, Rochester, MI (US); Gerhard Maier, Munich (DE); Claude Spino, Sherbrooks (CA); Thomas J. Chapaton, Sterling Heights, MI (US); Markus Gross, Kaufbeuren (DE); Armand Soldera, Sherbrooke (CA)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 12/136,979

(22) Filed: Jun. 11, 2008

(65) Prior Publication Data

US 2009/0043068 A1     Feb. 12, 2009

Related U.S. Application Data

(60) Provisional application No. 60/943,744, filed on Jun. 13, 2007.

(51) Int. Cl.
    *C08G 75/00*    (2006.01)
(52) U.S. Cl. ..................... 528/171; 528/220
(58) Field of Classification Search ................ 528/171, 528/220, 373
    See application file for complete search history.

(56) References Cited

U.S. PATENT DOCUMENTS

| 4,320,224 A | 3/1982 | Rose et al. |
| 4,474,932 A | 10/1984 | Bier et al. |
| RE34,085 E | 9/1992 | Rose et al. |
| 2004/0186262 A1 | 9/2004 | Maier et al. |
| 2006/0068256 A1* | 3/2006 | Arimura ..................... 429/33 |
| 2006/0249444 A1 | 11/2006 | Maier et al. |

OTHER PUBLICATIONS

Burk et al., Superacidity of Neutral Bronsted Acids on Gas Phase, Journal of Computational Chemistry, 1996, pp. 30-41, vol. 17, No. 1.
Koppel et al., Gas-Phase Acidities of Some Neutral Bronsted Superacids: A DFT and ab Initio Study, Journal American Chemical Society, 2000, pp. 5114-5124, vol. 122.
Gattin et al., Cooperative Intramilecular Hydrogen Bonding Effect and Basicity—An Ab Initio and DFT Study . . . , European Journal Organic Chemistry, 2005, pp. 3206-3213.
Eikerling et al., Molecular Orbital Calculation of Proton Dissociation and Hyrdation of Various Acidic Moieties . . . , J. New. Mat. Electrochem. Systems, 2002, pp. 15-23, vol. 5.
Klamt et al., First Principles Calculations of Aqueous Pkalpha Values for Organic and Inorganice Acids Using . . . , Journal Physical Chemistry, A 2003, pp. 9380-9386, vol. 107.
Kallies, Berd, A Connected System of Programs for Performing a Variety of Semiempirical and Ab Initio Molecular Orbital Calculations, Gaussian 03, Revision 2.4, Jul. 20, 2005, 1-4.
Engman et al., New Alkoxylated Dibenzo[1,4]dichalcogenines as Donors for Low-Dimenisonal Materials . . . , J. Chem. Society, Perkins Trans. 1, 1988, pp. 2095-2101.
Hoffmann et al., Poly(ether ketone)s by Fluoride Catalyst Systems, Macromolecules, 1994, pp. 3575-3579, vol. 27.
Cao et al., Synthesis and Properties of Poly(ether ether ketone)-Poly(ether sulfone) Block Copolymers, Polymer, Aug. 1994, pp. 3549-3556, vol. 35, Issue 16.

* cited by examiner

*Primary Examiner*—Randy Gulakowski
*Assistant Examiner*—Shane Fang
(74) *Attorney, Agent, or Firm*—Reising Ethington P.C.

(57) ABSTRACT

One embodiment of the invention contemplates a proton exchange membrane for use in a variety of fuel cells. The proton exchange membrane may comprise a solid phase organic based copolymer material in which a first structural unit is derived from a polymerizable organic super acid. The organic super acid may comprise an acid group such as a sulfonic acid group or a carboxylic acid group.

10 Claims, 1 Drawing Sheet

Fig. 1

ORGANIC SUPERACIDS, POLYMERS, DERIVED FROM ORGANIC SUPERACIDS, AND METHODS OF MAKING AND USING THE SAME

CROSS-REFERENCE TO RELATED APPLICATIONS

This application claims the benefit of U.S. Provisional Application No. 60/943,744 filed on Jun. 13, 2007, the entire contents of which are hereby incorporated by reference.

TECHNICAL FIELD

The field to which the disclosure generally relates includes cation exchange or cation conductive materials such as fuel cell electrolyte layers, products including fuel cell electrolyte layers, copolymers derived from organic superacids, and methods of making and using the same.

BACKGROUND

Monomers and prepolymers may be polymerized to make a variety of products. In some cases, it may be desirable to provide a polymer material having proton conductivity.

Many fuel cells are provided with an electrolyte layer that is sandwiched between an anode and a cathode, the assembly being known as a membrane-electrode assembly (MEA). In a proton exchange membrane (PEM) fuel cell, the electrolyte layer generally comprises a proton conducting solid phase polymer electrolyte and is often called an ion-exchange membrane or a proton exchange membrane. These polymer membranes are designed with the goal of accomplishing several functions that contribute to the overall operation of a PEM fuel cell, such as providing a conductive pathway for protons to migrate from the anode to the cathode, providing an electrical insulator between the anode and the cathode, and providing a gas impermeable layer that keeps the reactant gases separate and concentrated at their respective electrodes, to name but a few. Furthermore, the types of electrolytes associated with PEM fuel cells may be incorporated into direct methanol fuel cells (DMFC) due to similar operating conditions.

SUMMARY OF EXEMPLARY EMBODIMENTS OF THE INVENTION

In one embodiment of the invention, a proton exchange membrane may comprise an organic based polymer material that comprises a structural unit derived from an organic superacid that includes at least two acid groups. The acid groups may comprise a sulfonic acid group, a carboxylic acid group, a phosphonic acid group, or any other acid group that may have a structure which promotes intramolecular hydrogen bonding.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

DETAILED DESCRIPTION OF EXEMPLARY EMBODIMENTS

The following description of the embodiment(s) is merely exemplary in nature and is in no way intended to limit the invention, its application, or uses.

It is contemplated that an organic based proton exchange membrane comprising a solid phase organic based polymer material may be incorporated into various types of fuel cells to serve as an electrolyte layer situated between an anode layer and a cathode layer. In one embodiment, fuel cell performance may be enhanced by providing an organic based proton exchange membrane that exhibits improved proton conductivity at a low relative humidity. Allowing fuel cells to operate at a low relative humidity may reduce the problems associated with cathode flooding, water management and freeze start up, and possibly lower the cost of operating a fuel cell.

A variety of properties associated with the organic based polymer material that constitutes the organic based proton exchange membrane may contribute to an elevated and maintainable volumetric density of solvated protons which ultimately provides for improved proton conductivity. These properties may include one or more of, for instance, the presence of one or more high acidity acid groups represented by a relatively high acid dissociation constant ($pK_a$), the presence of one or more acid groups capable of deprotonating at a relatively low molar ratio of water to acid sites ($\lambda$), or a low molar volume of the acid moiety.

In one embodiment, a PEM fuel cell may comprise an organic based proton exchange membrane comprising a solid phase organic based copolymer material comprising at least one structural unit derived from a organic superacid capable of undergoing a polycondensation reaction with a second monomer. The term "superacid" as used herein means an acid having an acidity greater than 100% sulfuric acid. In one embodiment, the superacid may have two or more acid groups, such as a super diacid. In another embodiment, a plurality of organic super diacid structural units may be polymerized with a plurality of suitable and indistinguishable monomer units, or a mixture of suitable and chemically distinguishable monomer units, to form an alternating, random, or block copolymer strand. In another embodiment, a plurality of organic super diacid structural units may be present in hydrophilic polymer block segments that are subsequently linked with one or more suitable hydrophobic monomers or polymer block segments to form a linear or branched n-block copolymer strand where $n \geq 2$. In one embodiment, a triblock copolymer strand may include any linear arrangement of a hydrophilic organic super diacid polymer block segment linked between a first hydrophobic polymer block segment and a second hydrophobic polymer block segment. In yet another embodiment, several hydrophilic organic super diacid polymer block segments may be linked with multiple hydrophobic polymer block segments to form a random multiblock copolymer strand. Additionally, it is possible to form an organic based proton exchange membrane comprising a polymer material that has a monodispersed polymer composition comprising the alternating, random, n-block, or multiblock copolymer strands mentioned above. A method for producing a polymer material suitable for use as a proton exchange membrane that comprises copolymer strands synthesized in part from a plurality of organic super diacid structural units will be discussed in more detail at a later point. The particular organic super diacids suitable for use in such a method will now be described.

In one embodiment, an organic super diacid structural unit may be derived from an organic super diacid characterized by a strong acidity and capable of participating in a polycondensation reaction. The strong acidity may be attributed wholly or in-part to a molecular structure that promotes strong intramolecular hydrogen bonding between two acid groups in close spatial proximity. This hydrogen bonding may be supplemented by the positioning of OH, or other useful groups, in the diacid structure. Acidity may be further enhanced by molecular structures having electron withdrawing groups (EWG) linking the phenyl groups of the diacids. The strong acidity exhibited by the organic super diacid contributes to the ability of the super diacid to deprotonate at relatively low molar ratios of water to acid sites ($\lambda$). Examples of suitable acid groups include, but are not limited to, a sulfonic acid group, a carboxylic acid group, and a phosphonic acid group. Shown below is a general structure representing a multitude of organic super diacids that promote significant intramolecular hydrogen bonding and are capable of participating in a polycondensation reaction.

In one embodiment, A may be a sulfonic acid group (—SO$_3$H), carboxylic acid group (—COOH), or phosphonic acid group (—PO$_3$H$_2$); Z may be any linking atom or group such as SO$_2$ or CO; and Y' may be an oxygen atom (—O—), a sulfur atom (—S—), or a direct linkage between the two rings. In another embodiment, the 2, 3, 7, and 8 positions of the super diacid may comprise any group that functions, either directly or through a subsequent reaction mechanism, to render the super diacid receptive to a copolymer synthesis reaction. For copolymer synthesis by a polycondensation reaction, suitable groups include H, OH, SH, or groups prone to nucleophilic displacement, like halides or NO$_2$. Other functional groups, such as vinyl or oxirane, may be used for free radical copolymerization of the super diacid. Furthermore, the 1 and 9 positions may be bonded to H or a similar electropositive group.

In one embodiment, the organic super diacid may be phenoxathiin-4,6-disulfonic acid 10,10-dioxide (PHX) (named according to IUPAC rules), which is shown below with dashed lines representing intramolecular hydrogen bonding.

However, for purposes of being consistent in the specification and claims herein the carbons will be numbered clockwise so that the above described super diacid will be referred to as follows phenoxathiin-1,9-disulfonic acid 5,5-dioxide (PHX) which is shown below with dashed lines representing intramolecular hydrogen bonding.

In another embodiment, the organic super diacid may be thianthrene-1,9-disulfonic acid 5,5-dioxide (THA), which is shown below with dashed lines representing intramolecular hydrogen bonding.

In still another embodiment, the organic super diacid may be dibenzo[b,d]thiophene-1,9-disulfonic acid 5,5-dioxide (DBT), which is shown below with dashed lines representing intramolecular hydrogen bonding.

The ability of the organic super diacids listed above to deprotonate at low molar ratios of water to acid sites was simulated according to the Beck-3-Lee-Yang-Par hybrid density functional with the 6-311G(p,d) basis set (B3LYP//6-311G(d,p) model chemistry). The validity of the B3LYP simulation calculation and its results were substantiated by identical calculations using the same model chemistry for both trifluoromethanesulfonic acid and sulfuric acid, both of which have established $\lambda$ thresholds based on different model chemistries and experimental calculations. The results of the simulations were compared against known $\lambda$ thresholds for both trifluoromethanesulfonic acid and sulfuric acid and were found to be fairly similar, thus confirming the appropriateness of the B3LYP calculation and its parameters.

Through the B3LYP calculations, it was possible to determine the equilibrium conformations of the PHX, THA, and DBT diacids when interacting with small water clusters, such as $0 \leq \lambda \leq 4$, and to establish the molar ratio of water to acid sites required for deprotonation. Generally, as between two acids, the acid with a lower $\lambda$ threshold is the stronger the acid because it can deprotonate in the presence of less water than the acid with the higher λ threshold. Of the three organic super diacids, PHX was found to be the strongest acid possessing a λ value of 1.0. Furthermore, to put the λ value of PHX into context, the λ values of benzenesulfonic acid and trifluoromethanesulfonic acid were calculated to be 5.0 and 3.0, respectively. And both sulfuric acid and trifluoromethanesulfonic are generally regarded as very strong acids.

Additionally, $pK_a$ values were calculated for the above described organic super diacids using the semi-empirical continuum solvation model COSMO, which is a statistical thermodynamic treatment of continuum solvation. To verify these results, this model was used to calculate the $pK_a$ values of numerous acids that have known $pK_a$ values based on experimental procedures. The relationship between the calculated $pK_a$ values and the published experimental values were sufficiently correlated and the model was deemed to be an accurate and satisfactory measure of the $pK_a$ values of the organic super diacids. The calculated $pK_a$ values of PHX, THA, and DBT were −6.6, −8.8, and −8.1, respectively. For contextual purposes only, the calculated $pK_a$ values of sulfuric acid, methanesulfonic acid, and phenylsulfonic acid were −4.8, −1.7 and −2.0, respectively. These calculated values were found to be in good agreement with corresponding experimental values of −3.0, −2.6 and −2.6, respectively.

The organic super diacids just discussed may be modified to include alcohol groups located either meta-, para-, or meta- and para- to the group represented by Z in the general organic super diacid structure shown earlier. The addition of alcohol groups to the organic super diacid may provide for additional intramolecular hydrogen bonding, as well as linkage sites suitable for polymerization by a condensation reaction. It should be noted that the number and position of any alcohol groups may affect the characteristics of the super diacid with regards to polymerization. For instance, while it is feasible for any alcohol group to participate in a condensation reaction, the acidity of the super diacid is stronger when two alcohols are preserved adjacent to the bridge between the phenols following polymerization. Furthermore, polymerization reactions involving super diacids with alcohol groups at three or four positions (three or more alcohol sites) may promote crosslinking between polymers which can reduce membrane swelling and enhance mechanical strength and resiliency. However, on the other hand, polymerization reactions involving super diacides with alcohol groups at two positions may produce linear polymers without crosslinks which leads to improved solubility and enhanced film forming properties. The general structure of the readily polymerizable organic super diacid shown before is reproduced below and is modified to include the possible addition of alcohol groups.

In one embodiment, as in the earlier structure, A may be a sulfonic acid group (—SO₃H) a carboxylic acid group (—COOH), or phosphonic acid group (—PO₃H₂); Z may be a linking group such as SO₂ or CO; and Y' may be an oxygen atom (—O—), a sulfur atom (—S—), or a direct linkage between the two rings. The B group may represent an alcohol group (—OH), a halide, a chemically stable low molar volume ether group such as methyl ether (—OCH₃), isopropyl ether (—OCH(CH₃)₂), t-butyl ether (—OC(CH₃)₃), trifluoro- or trichloro-methyl ether (—OCF₃, —OCCl₃), a low molar volume ester group such as acetates (—OC(O)CH₃), or a low molar volume carbonate such as butoxycarbonyl (—OC(O)OC(CH₃)₃). The low molar volume of the B group helps maintain the maximum molarity of solvated protons by minimizing the molar volume per acid hydrogen of the organic super diacid.

In one embodiment, the organic super diacid may be 3,7-dihydroxy-2,8-dimethoxyphenoxathiin-4,6-disulfonic acid 10,10-dioxide (DHPHX) (named according to IUPAC rules), which is shown below with dashed lines representing intramolecular hydrogen bonding.

However, for purposes of being consistent in the specification and claims herein the carbons will be numbered clockwise so that the above described super diacid will be referred to as follows 2,8-dihydroxy-3,7-dimethoxyphenoxathiin-1,9-disulfonic acid 5,5-dioxide (DHPHX) which is shown below with dashed lines representing intramolecular hydrogen bonding.

In this embodiment, alcohol groups are located on each phenol ring para- to the sulfonyl bond, and methyl ether groups are located on each ring meta- to the sulfonyl bond. However, it is understood that alternative configurations are possible, such as swapping the positions of the alcohol groups with those of trifluoromethyl ether or methyl ether groups, or substituting these methyl ether groups for two additional alcohol groups. The corresponding molar volume per acid hydrogen of DHPHX in this embodiment is estimated at 127 cm³.

In another embodiment, the organic super diacid may be 2,8-dihydroxy-3,7-dimethoxythianthrene-1,9-disulfonic acid 5,5-dioxide (DHTHA), which is shown below with dashed lines representing intramolecular hydrogen bonding.

In still another embodiment, the organic super diacid may be 2,8-dihydroxy-3,7-dimethoxydibenzo[b,d]thiophene-1,9-disulfonic acid 5,5-dioxide (DHDBT), which is shown below with dashed lines representing intramolecular hydrogen bonding.

Similar to DHPHX, alternative configurations for both DHTHA and DHDBT are possible and may be utilized during polymerization to influence various properties of the polymer.

It should be understood by those skilled in the art that a wide variety of polymers comprising structural units derived from the embodiments disclosed above, both general and specific, may be achieved. For example, the identity of the acid group, the number and location of alcohol groups, and the linkage between the rings opposite the sulfonyl group may all be varied as previously mentioned or in accordance with the knowledge and understanding of those skilled in the art. One embodiment of a method of synthesis of an organic super diacid and its corresponding polymerization will now be described with reference to an organic super diacid of the PHX and DHPHX type. The following description is not limited to the specific organic super diacid discussed or the corresponding polymer generated, but instead is applicable to all general embodiments disclosed, including the organic super diacid of the THA and DHTHA type, and the organic super diacid of the DBT and DHDBT type. Furthermore, the super diacids of this invention, as well as the super diacids that are useful in various embodiments of the invention, are not limited to the synthesis methods described herein.

The synthesis path may begin with the organic super diacid precursor molecule 2,3,7,8-tetramethoxyphenoxathiin (TMP). The synthesis of TMP has been previously described in the literature and can readily be manipulated into an appropriate PHX or DHPHX related organic super diacid in a three or four step process, depending on the desired outcome. The organic super diacid may then be subsequently polymerized into a polymer by established methods of polycondensation. The resulting polymer may then be incorporated into a polymer material that may be used to construct a proton exchange membrane for use in an assortment of fuel cells.

The first step in forming the PHX and DHPHX related organic super diacid is to oxidize the sulfur atom in TMP to produce a sulfonyl group. Oxidation of the sulfur atom may be accomplished with a variety of reagents known to those of skill in the art, most notably by oxone (2KHSO$_5$.KHSO$_4$.K$_2$SO$_4$), mCPBA, or hydrogen peroxide (H$_2$O$_2$). The oxidation step is illustrated below.

-continued

After oxidizing the sulfur atom in TMP, the methyl ether groups may be removed using NaSEt, BBr$_3$, or any other suitable reagent known to those of ordinary skill in the art. This step is illustrated below. It should be noted that the methoxy groups located para to the sulfone group would be cleaved faster than the ones located meta to the sulfone group. Thus, a diol compound could be obtained that would permit the chemical differentiation of the two pairs of phenolic hydroxyl groups.

Following oxidation of the sulfur atom and removal of the methyl ethers, the resulting molecule may undergo sulfonation, or it may undergo an additional step prior to sulfonation in order to modify one or more alcohol groups, if desired. If directly proceeding to sulfonation is desired, then the molecule may be exposed to fuming sulfuric acid or subjected to another method of electrophilic aromatic substitution to produce an organic super diacid, as illustrated below.

The addition of sulfonic acid groups in the manner shown above occurs rather easily and predictably for a number of reasons. First, the aromatic rings of the molecule that may undergo sulfonation are electron-rich. Second, it is energetically favorable for the sulfonic acid groups to bond at the positions ortho- to the ring oxygen atom as evidenced by ab initio free energy of formation calculations performed for each possible diacid stereoisomer. In fact, for each stereoisomer, both the enthalpy of formation and the Gibbs free energy were calculated using the B3LYP/6-311G(d,p) model chemistry in order to predict the probable bonding sites for sulfonic acid groups during sulfonation. The calculations indicate that the stereoisomer shown above, with sulfonic acid groups located ortho- to the ring oxygen atom, is energetically favored over the other possible sterioisomers by over 70 KJ/mole, and thus, would be the principal product of the sulfonation step in this method of diacid synthesis.

However, as mentioned earlier, it may be desirable to modify one or more alcohol groups following oxidation and the subsequent removal of the methyl ether groups. In this case, selective modification of the alcohol groups may be achieved by exploiting the differences in the acidities of the alcohol groups based on their location in reference to the sulfonyl group. In one embodiment, the alcohol groups positioned para- to the sulfonyl bond may be preferentially deprotonated in the presence of a relatively strong base because the para-alcohols are more acidic than the meta-alcohols. And once deprotonated, the para-positions are more nucleophilic than the meta-positions and may therefore be preferentially alkylated or acylated. A possible modification to the alcohol groups located para- to the sulfonyl bond on each ring may be the formation of ether groups comprising the ligand $R^1$. The molecule may then undergo sulfonation by exposure to fuming sulfuric acid, or another method of electrophilic aromatic substitution. The two steps just described are illustrated below.

On the other hand, the free alcohol groups positioned meta- to the sulfonyl bond are more nucleophilic than the para-alcohols when not deprotonated, thus allowing the meta-alcohols to be preferentially alkylated or acylated in the presence of a weak base. In this embodiment, the alcohol groups located meta- to the sulfonyl bond on each ring may be transformed into ether groups comprising the ligand $R^2$. The molecule may then undergo sulfonation by exposure to fuming sulfuric acid, or another method of electrophilic aromatic substitution. The two steps just described are illustrated below.

In the above embodiments, both $R^1$ and $R^2$ may be chemically stable, low molar volume ligands such as a methyl group ($-CH_3$) or a trifluoromethyl group ($-CF_3$). The low molar volume of the ligands helps minimize the molar volume of the diacid per acid hydrogen. Furthermore, it is still energetically favorable for the sulfonic acid groups to bond at the locations ortho- to the ring oxygen atom. In fact, the presence and location of ether groups comprising ligands $R^1$ or $R^2$ has little appreciable effect on the energetic preference of sulfonic acid groups to bond to each ring at the location ortho- to the ring oxygen atom during sulfonation.

While various steps in organic super diacid synthesis have been described, it should be noted that polymerization is feasible prior to the sulfonation step in which sulfonic acid groups are bonded to the aromatic rings. It is contemplated that a sulfonation step following polymerization would produce at most a slight hindrance in membrane conductivity because overall sulfonation at locations ortho- to the linkage between rings and opposite the sulfonyl group would remain high.

A method of synthesizing a copolymer comprising an organic super diacid structural unit will now be described with reference to organic super diacids of the PHX and DHPHX type. As mentioned before, the following description is not limited to the specific organic super diacid discussed and the corresponding copolymer generated, but may also be practiced with the other general embodiments disclosed, including the organic super diacid of the THA and DHTHA type, and the organic super diacid of the DBT and DHDBT type. Furthermore, membranes derived from super diacids according to various embodiments of the invention are not limited to those produced from the polymer synthesis methods described herein.

In one embodiment, a random copolymer strand may be formed from an organic super diacid that comprises one or more alcohol groups capable of participating in a polycondensation reaction. For example, the random copolymer strand may comprise a structural unit derived from an organic super diacid having a functionality of up to four, as previously shown.

In the presence of a base and solvent, the organic super diacid may be polymerized by reaction with an aromatic compound comonomer such as an aromatic dihalide, aromatic dihydroxy, aromatic dimercapto, or other similar compound commonly used by those skilled in the art to synthesize aromatic polyethers. The particular aromatic compound or compounds selected for the polycondensation reaction depends on the identity of the functional groups or chemical groups located at the polycondensation linkage sites of the organic super diacid, generally referred to as the B group in the general organic super diacid structure shown earlier. The polycondensation reaction of an organic super diacid having a functionality of four and an aromatic dihalide comonomer is shown generally below.

The aromatic dihalide comonomer may have a suitable leaving group X such as —F, —Cl, —Br, —NO$_2$, or the like, and an electron withdrawing group Y such as, —CO—, —SO$_2$—, —P(O)R—, perfluoroalkyl, and heteroaromatic rings including pyridine, oxazole, benzoxazole, quinoxaline, quinoline, oxadiazole, and the like. For example, in various embodiments, the aromatic compound may be the aromatic dihalide 4,4'-difluorodiphenylsulfone, 4,4'-dichlorodiphenylsulfone, 4,4'-difluorobenzophenone, 1,3-bis(4'-fluorobenzoyl)benzene, or any other suitable aromatic dihalide known to those skilled in the art. The appropriate base for the polycondensation reaction may vary, but typical examples include sodium hydroxide (NaOH) and potassium carbonate (K$_2$CO$_3$). Similar to the base, a wide variety of solvents may also contribute to the polycondensation reaction, such as, but not limited to, sulfolane, diphenylsulfone, dimethyl fluoride, dimethyl sulfoxide, dimethylacetamide, N-methylpyrrolidinone, or the like, and combinations thereof.

The aromatic compound comonomer may have to be altered if the functionality of the organic super diacid is less than four because a halide is occupying one or more of the 2, 3, 7, or 8 positions of the organic super diacid. For example, an aromatic dihydroxy or an aromatic dimercapto may serve as the aromatic compound comonomer. In this instance, X would be —OH (dihydroxy), —SH (dimercapto), or a similar group, and Y may be a group such as —O—, —S—, —CO—, —SO$_2$—, —P(O)R—, alkyl, perfluoroalkyl, a single bond, or heteroaromatic rings including pyridine, oxazole, benzoxazole, quinoxaline, quinoline, oxadiazole, and the like.

The number m of monomer structural units in the random copolymer material may vary depending on a multitude of factors known to those skilled in the art. It is also conceivable to form a copolymer material that comprises a mixture of monomer structural units due to differences in the chemical identity of the electron withdrawing group Y. In this situation, the copolymer material may comprise a plurality of organic super diacid structural units bonded to at least one of a variety of monomer structural units containing an internal ether, ketone, thio, alkyl, perfluoroalkyl, or sulfone linkage. Furthermore, it is possible to generate a copolymer material that terminates with reactive sites such as NaO, —OH, —F, —Cl or the like by performing a polycondensation reaction with an excess of either the organic super diacid or the one or more aromatic compound comonomers. The resulting copolymer with terminal reactive sites may provide a mechanism for subsequent linkage with hydrophobic polymer block segments that comprise halogenated terminations.

Similar to the polycondensation reaction shown above for an organic super diacid having a polymer functionality of four, a polymer may also comprise a structural unit derived from one of the organic super diacids previously shown having a polymer functionality of less than four due to the presence of non-functional groups located para- or meta- to the sulfonyl bond. For example, in one embodiment, the functionality of the organic super diacid may be two. These organic super diacids may be synthesized into a similar copolymer by application of the identical polycondensation reaction used to link the organic super diacid having a polymer functionality of four with the aromatic compound comonomer. The polycondensation reaction of the organic super diacid comprising non-functional groups located para- to the sulfonyl bond is shown generally below.

Also, the polycondensation reaction of the organic super diacid comprising non-functional groups located meta- to the sulfonyl bond is shown generally below.

While each of the above embodiments described result in random copolymers, it is also contemplated, as mentioned before, that those skilled in the art are capable of manipulating the organic super diacid polymer synthesis process to form copolymers that comprise an alternating copolymer, an n-block copolymer where 2≦n≧5, or a random multiblock copolymer. For example, commonly assigned United States Patent Applications 2004/0186262 filed Jan. 30, 2004 and 2006/0249444 filed May 3, 2005 both disclose block copolymer teachings that may be useful in conjunction with the organic superacids disclosed herein for fabricating organic based proton exchange membranes.

Figure 1:
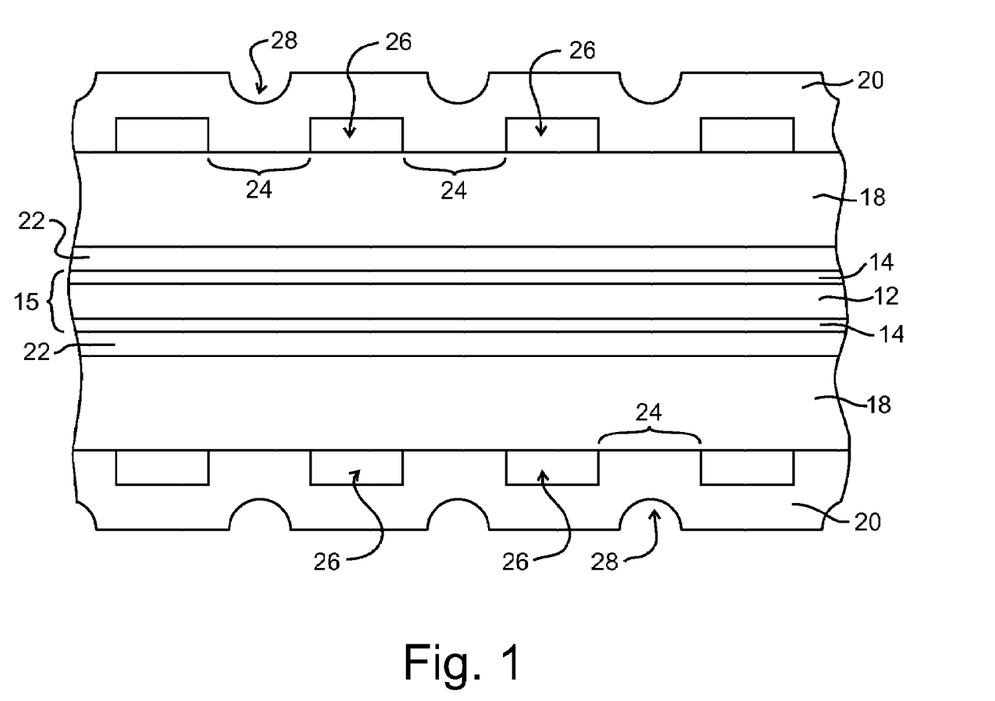
FIG. 1 illustrates a product according to one embodiment of the invention.

Referring now to FIG. 1, one embodiment of the invention may include a fuel cell 10 including an electrolyte layer 12 comprising an organic based proton exchange membrane fabricated from the organic polymer structures previously discussed. The organic based proton exchange membrane may be in various types of fuel cells, such as proton exchange membrane fuel cells and direct methanol fuel cells.

The fuel cell 10 is an electrochemical device that combines a fuel such as hydrogen with an oxidant such as oxygen to produce electricity. The fuel cell 10 may include an electrolyte layer 12 sandwiched between two electrode layers 14, the combination being known as a membrane electrode assembly (MEA) 15. In practice, the electrode layers 14 are further defined as an anode and a cathode, both of which facilitate chemical reactions that occur in the fuel cell 10. The anode is defined as the electrode layer 14 that electrons flow away from and the cathode is defined as the electrode layer 14 that electrons flow towards.

The electrode layers 14 generally may include small catalyst particles mixed with a binder such as an ionomer. The binder serves to fix the catalyst particles in a structure that allows for optimal contact between the catalyst particles contained in the electrodes 14 and the electrolyte 12. In one embodiment, the binder may include the types of organic super acid based copolymers disclosed herein. Platinum metals and platinum alloys are popular examples of catalyst particles and may be utilized as either a pure catalyst or a supported catalyst. In the case of a supported catalyst, the small catalyst particles may be finely divided over larger carbon or graphite support particles.

Gas diffusion layers (GDL) 18 are situated alongside the surfaces of the electrode layers 14 that are furthest from the electrolyte layer 12. GDL's 18 serve numerous functions and may include carbon-based materials that render the layer porous and conductive. A GDL 18 comprises a porous media to assist in diffusing the reactant gases equally across their respective electrode layers 14, as well as to move water or any other liquid away from the electrode layers 14. The porous media of the GDL 18 is also conductive to provide an electrical pathway from the electrode layers 14 to the current collector so that the electrons generated at the anode can be extracted from the fuel cell 10 and eventually returned to the cathode. A further function of the GDL 18 is to provide a basic mechanical structure for the MEA 15. Typically, carbon-based materials that make up a GDL 18 may include, but are not limited to, carbon cloth, non-woven pressed carbon fibers, carbon paper, or a felt-like carbon material.

It is also common to add various materials to a GDL 18. For example, GDL's 18 may include a microporous layer 22 interposed between the GDL 18 and the electrode layer 14 to assist in water management within a fuel cell 10. A microporous layer 22 may include a binder and some other component that influences the binder's affinity towards water.

To produce a useful voltage, many fuel cells 10 may be connected in series to form a fuel cell stack. A common approach to form a fuel cell stack is to connect adjacent fuel cells 10 through a bipolar plate 20. A bipolar plate 20 may form an electrical connection 24 over a large portion of the GDL layer 18 so as to minimize the electrical resistance that leads to a voltage drop when an electron travels between the bipolar plate 20 and the electrode layer 14. At the same time, a bipolar plate 20 provides reactant gas flow channels 26 for separately feeding a fuel to the anode and an oxidant to the cathode. To satisfy these two competing interests, the gas flow channels 26 are sized to allow a sufficient amount of fuel or oxidant to be supplied to the electrode layer 14 while at the same time providing adequate surface contact with the GDL layer 18 to facilitate the transfer of electrons. A bipolar plate 20 may also include coolant flow channels 28 that can support the flow of a coolant vapor or a coolant liquid if necessary. Bipolar plates 20 may include a conductive material such as, but not limited to, graphite, a polymeric carbon composite, stainless steel, aluminum, titanium, or combinations thereof.

The above description of embodiments of the invention is merely exemplary in nature and, thus, variations thereof are not to be regarded as a departure from the spirit and scope of the invention.

The invention claimed is:

1. A method comprising:
providing a polymerizable organic superdiacid monomer that has the general formula and wherein A comprises a sulfonic acid group, a carboxylic acid group, or a phosphoric acid group, Y' is O, S, or a direct carbon bond, each individual B comprises any of an alcohol, a halide, $NO_2$, a low molar volume ether group, a low molar volume ester group, or a low molar volume carbonate group with the proviso that at least two are alcohols, and Z is a sulfonyl group or a carbonyl group; and
polymerizing the polymerizable organic superdiacid monomer by way of a polycondensation reaction.

2. The method of claim 1 wherein polymerizing the polymerizable organic superdiacid monomer comprises polymerizing, by way of a polycondensation reaction, the polymerizable organic superdiacid monomer with an aromatic monomer that has the general formula and wherein Y comprises an electron withdrawing group; and
X comprises a leaving group.

3. The method of claim 2 wherein Y comprises —O—, —S—, —CO—, —$SO_2$—, —P(O)R—, an alkyl group, a perfluoroalkyl group, or a heteroaromatic ring, wherein R is a hydrocarbon group.

4. The method of claim 3 wherein the heteroaromatic ring comprises pyridine, oxazole, benzoxazole, quinoxaline, or oxadiazole.

5. The method of claim 2 wherein X comprises F, Cl, Br, or $NO_2$, OH, or SH.

6. The method of claim 5 wherein X is OH or SH if any B of the polymerizable organic superdiacid monomer is a halide.

7. The method of claim 2 wherein the aromatic monomer comprises one of 4,4'-difluorobenzophenone, 4,4'-difluorodiphenylsulfone, 4,4'-didichlorodiphenylsulfone, or 1,3-bis(4'-fluorobenzoyl)benzene.

8. The method of claim 1 wherein polymerizing the polymerizable organic superdiacid monomer comprises polymerizing the polymerizable organic superdiacid in a solvent and a base.

9. The method of claim 8 wherein the solvent is comprises sulfolane, diphenylsulfone, dimethylfluoride, dimethylsulfoxide, dimethylacetamide, N-methylpyrrolidinone, or combinations thereof.

10. The method of claim 8 wherein the base comprises sodium hydroxide, potassium carbonate, or a combination thereof.

* * * * *

UNITED STATES PATENT AND TRADEMARK OFFICE
CERTIFICATE OF CORRECTION

| | | |
|---|---|---|
| PATENT NO. | : 7,718,753 B2 | Page 1 of 1 |
| APPLICATION NO. | : 12/136979 | |
| DATED | : May 18, 2010 | |
| INVENTOR(S) | : Tenneille Weston Capehart, deceased et al. | |

It is certified that error appears in the above-identified patent and that said Letters Patent is hereby corrected as shown below:

On the Title page, in Inventors, after "Spino," delete "Sherbrooks" and insert therefor -- Sherbrooke --.

Column 2, Line 27; After "constant (" delete "p".

Signed and Sealed this
Fifteenth Day of February, 2011

David J. Kappos
*Director of the United States Patent and Trademark Office*